United States Patent Office 3,566,245
Patented Feb. 23, 1971

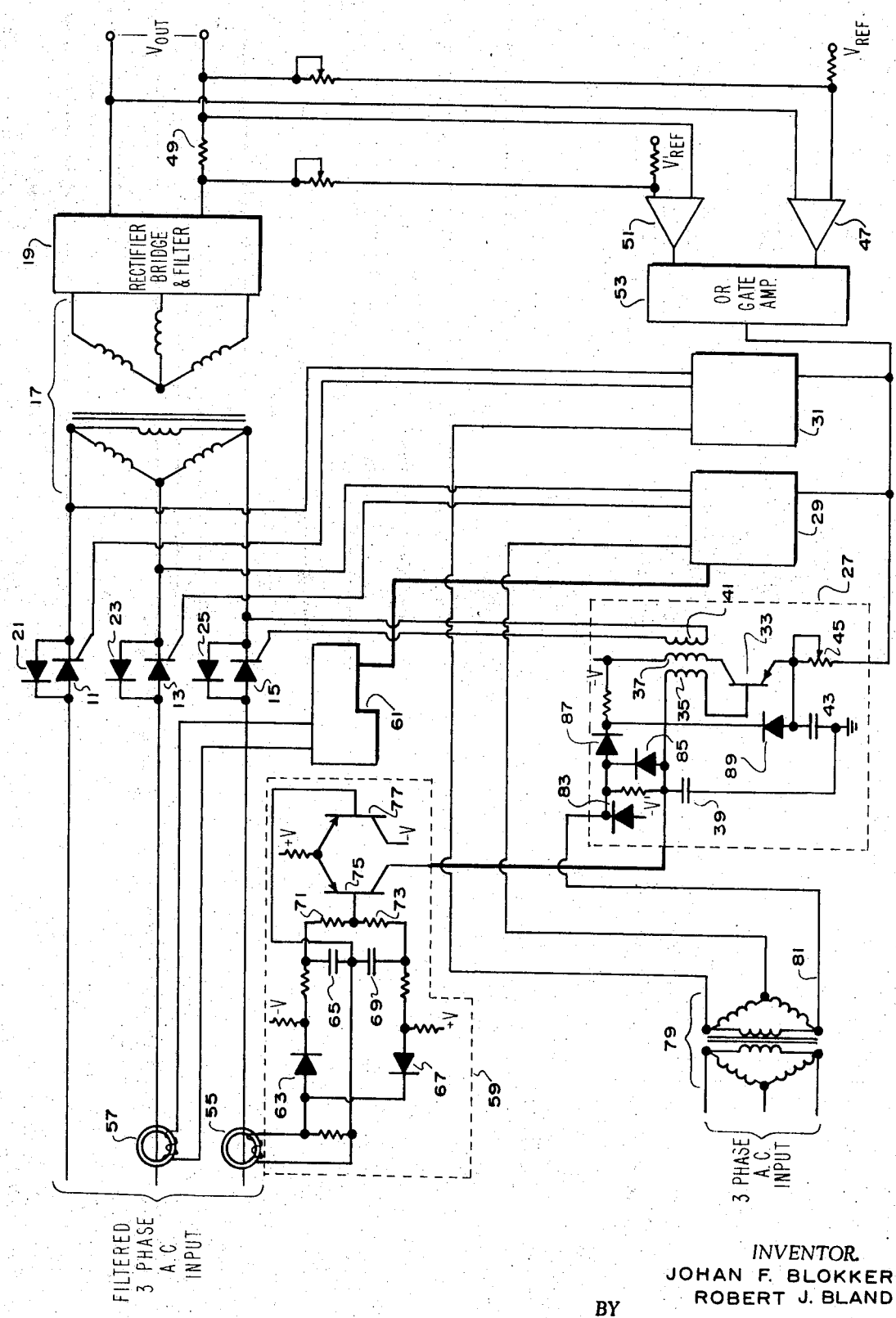

3,566,245
THREE PHASE REGULATED D.C. POWER SUPPLY WITH CONTROL FOR BALANCING INPUT PHASE CURRENT
Johan F. Blokker, Summit, and Robert J. Bland, Berkeley Heights, N.J., assignors to Hewlett-Packard Company, Palo Alto, Calif., a corporation of California
Filed Jan. 21, 1969, Ser. No. 792,250
Int. Cl. H02m 7/12
U.S. Cl. 321—5     9 Claims

ABSTRACT OF THE DISCLOSURE

A power supply system has a regulated D.C. output and a three phase A.C. input. Input current in each phase is controlled by a silicon controlled rectifier (SCR). Three blocking oscillators produce output pulses for firing the SCR's at phase angles determined in response to the D.C. output voltage and current. Additionally the firing angles for two of the three SCR's are automatically adjusted to balance current among the three phases at the input. This is achieved by circuitry which senses and compares the positive and negative input current in two of the phases and produces difference signals which drive two of the blocking oscillators to adjust the firing angles of two of the SCR's until phase current is equalized.

BACKGROUND OF THE INVENTION

In a typical three phase D.C. power supply, unregulated input power is applied over three input lines to a transformer and thence through rectifier circuitry to a load. The D.C. power to the load is regulated by appropriately gated SCR's in the A.C. input lines. One major problem in this type of power supply is that the currents in the three input lines may become unbalanced. Even a small unbalanced condition may cause the input transformer to tend toward saturation, which in turn further unbalances the line currents. Ultimately the current in one of the input lines exceeds its rated value and a protective device such as a circuit breaker operates to disconnect the input, thus shutting down the system. Input line unbalance may be caused in a variety of ways, such as by unequal impedances in the three primary or secondary windings of the input transformer, by drift of the gate firing pulses for the SCR's, or by unequal voltages or impedances on the three phase input power lines. It is apparent that the equalization of phase currents on the three input lines is a highly desirable objective.

SUMMARY OF THE INVENTION

In accordance with the foregoing objective, the present invention, in the illustrated embodiment comprises a power supply having a three phase A.C. input and a regulated D.C. output. Each of the three A.C. input lines contains a series connected SCR, which is fired or gated into conduction at a selected phase angle of the A.C. input by an associated pulse generating circuit. The gating pulses for all three of the SCR's are generated at phase angles dependent upon the D.C. output voltage and current conditions. In addition, the firing angles for two of the three SCR's are adjusted by phase current balancing circuitry to automatically produce equalization of the current in the three A.C. input lines.

The phase current balancing circuitry senses current in two of the three input lines and compares the magnitudes of the positive and negative current pulses sensed in each line. As a result of this comparison, a difference signal is produced and used to control the associated gating pulse generating circuit and SCR. The firing angles of the two SCR's are advanced or retarded until the difference signal indicates that the input currents sensed in the two lines are equal. When currents in two of the input lines are balanced, the currents in all three lines will be equal.

BRIEF DESCRIPTION OF THE DRAWING

The single figure is a combined schematic and block diagram of the preferred embodiment of the invention.

DESCRIPTION OF THE PREFERRED EMBODIMENT

Referring now to the figure, suitably filtered three phase A.C. input power is applied through three silicon controlled rectifiers (SCR's) 11, 13 and 15 to the delta connected primary windings of a main power transformer 17. The Y connected secondary windings of this transformer are connected to a rectifier bridge and filter circuit 19 to provide a D.C. output voltage $V_{out}$. The three SCR's 11, 13, 15 are separately controlled and are gated into conduction at selected phase angles to regulate the output voltage $V_{out}$ and to maintain the phase current in the three input lines in a balanced condition. Three diodes 21, 23, 25 respectively connected across the three SCR's conduct currents returning to the A.C. lines through the transformer, and insure that the SCR's are never subjected to reverse voltage.

The three SCR's 11, 13, 15 have respectively associated therewith three pulse generating circuits 27, 29, 31, each of which fires its corresponding SCR into conduction once during each cycle of the input line frequency. The three pulse generating circuits have substantially the same configuration, as exemplified by that shown in the figure inside the dashed line block representing pulse generating circuit 27. This pulse generating circuit is essentially a blocking oscillator which includes a transistor 33 having its base and collector electrodes inductively coupled by two windings 35, 37 of a blocking oscillator transformer.

The base of transistor 33 follows the voltage on a capacitor 39, which is charged as hereinafter described. As the base voltage rises, the emitter voltage also rises to meet the base voltage. As a result, this transistor begins to conducft, and the regenerative coupling between the base and collector windings 35, 37 causes the transistor to go into saturation, where it remains until the saturation region of the blocking oscillator transformer is reached. At this point, the base-collector coupling action collapses and transistor 33 returns to the nonconducting state.

The blocking oscillator transformer also includes an output winding 41 which is connected between the gate and cathode electrodes of SCR 15. When transistor 33 switches from its nonconducting state to its conducting state, an output pulse is produced at winding 41 which fires SCR 15. The phase angle at which SCR 15 is fired depends on the timing of the output pulse from the blocking oscillator. This in turn depends on the charging rate of the base capacitor 39 and an emitter capacitor 43. The charging rates of these two capacitors are controlled by circuitry hereinafter described.

The input to pulse generating circuit 27 which controls the charge on capacitor 43 is applied through a variable resistor 45 and is dependent on the voltage and current conditions at the D.C. output from the rectifier bridge and filter circuit 19. Specifically, the D.C. output voltage $V_{out}$ is sensed and then compared with a predetermined reference voltage $V_{ref}$ by a differential amplifier 47. Also, the D.C. output current is sensed by a current sensing resistor 49, and the voltage across this resistor is compared with a reference voltage $V'_{ref}$ by a differential amplifier 51. The two amplifiers 47, 51 produce error signal outputs indicative of deviations in the output current and voltage conditions from predetermined standards. These error signals are combined in an OR gate amplifier circuit 53, the ouput of which charges the emitter capacitor (43) in each of the pulse generating circuits 27, 29, 31.

Additional circuitry is provided to control the two pulse generating circuits 27, 29 so that the firing angles of the corresponding SCR's 15, 13 are automatically adjusted to balance the input current in the three phases. Each of the three phases carries both positive and negative current. In any one of the three lines, there will be positive current during the time that the corresponding SCR is conducting, and there will be negative current when the corresponding SCR is not conducting, but when the SCR in one of the other two input lines is conducting. When the magnitudes of the positive and negative current in two of the three input lines are equal, then the phase currents in all three input lines are balanced.

The phase current balancing circuitry includes two current sensing transformers 55, 57 for sensing current in two of the input lines, respectively. The positive and negative currents sensed by each of the two current sensing transformers 55, 57 are compared in magnitude in each of the two circuits 59, 61. The two circuits 59, 61 are identical so only the configuration and operation of the former is described herein.

In circuit 59, a diode 63 conducts positive current pulses from sensing transformer 55 and causes a capacitor 65 to be charged in a positive direction. Similarly, a diode 67 conducts negative current pulses and causes a capacitor 69 to be charged negatively. The two capacitors 65, 69 have a common junction point provides a reference voltage equal to that at the zero crossover point between positive and negative current pulses. Two resistors 71, 73 of equal value form a voltage divider which is connected between the end terminals of capacitors 65, 69. The center-tap of the voltage divider provides a voltage signal which is referenced to the sum of the positive and negative potentials stored by the capacitors 65, 69. This voltage signal varies with the relative difference in magnitudes of the positive and negative current pulses sensed by transformer 55. The voltage signal at this center-tap is compared with the reference voltage at the junction point of capacitors 65, 69 by a differential amplifier including two transistors 75, 77. The collector of transistor 75 provides a difference a signal output which charges capacitor 39 in the pulse generating circuit 27.

As stated hereinabove, the phase angle at which the SCR gating pulse is produced by the pulse generating circuit 27 is dependent on the charging rate of the base capacitor 39 and the emitter capacitor 43. It can be seen that the two capacitors are charged respectively by the phase current balancing circuitry 59, and the D.C. output current and voltage regulating circuitry which includes comparison amplifiers 47, 51. For example, if the positive current pulses sensed by transformer 55 are greater than the negative current pulses, the difference signal output from phase balancing circuit 59 will decrease which in turn causes capacitor 39 to charge at a slower rate and thus advance the firing angle of SCR 15. Also, if the D.C. output voltage and/or current vary from their predetermined references, the output from OR gate amplifier 53 charges capacitor 43 at either a slower or faster rate, which in turn retards or advances the firing angle of SCR 15 to regulate the output power.

The three pulse generating circuits 27, 29, 31 produce SCR gating pulses sequentially and in synchronism with the phase rotation of the three phase A.C. input. Each pulse generating circuit produces a gating pulse only once during each cycle of its respective phase. In pulse generating circuit 27, for example, when the blocking oscillator conducts, the emitter capacitor discharges negatively, and the base capacitor charges positively to prevent the block-oscillator from retriggering during the same cycle. At the end of the cycle, these two capacitors are reset for the next cycle.

The three pulse generating circuits 27, 29, 31 are reset and selectively enabled in sequence by circuitry which includes a bias transformer 79 having delta connected primary windings for receiving the three phase A.C. input, and delta connected secondary windings, the outputs of which connect to the three pulse generating circuits. Considering now the resetting operation in pulse generating circuit 27, the voltage on the secondary phase line 81 is clamped to a source of negative reference voltage $-V'$ by a diode 83 during a portion of the corresponding A.C. cycle. During the time that diode 83 conducts, the base capacitor 39 is held at the reference voltage $-V'$ by a diode 85. Another diode 87 produces a small voltage drop, on the order of 0.7 volt, so that a diode 89 holds the voltage at the emitter capacitor 43 slightly more negative than that at the base capacitor 39. The 0.7 volt difference reverse biases the blocking oscillator transistor 33, thus rendering it inoperative. When the voltage on the secondary phase line 81 becomes more positive than the reference voltage $-V'$, the clamping action of diode 83 ceases and the base and emitter capacitors 39, 43 follow their respective input signals from the phase current balancing circuit 49 and the OR gate amplifier 53.

The resetting and selective enabling operation of pulse generating circuits 29, 31 is similar to that of pulse generating circuit 27 described above. Clamping diode 83 and the clamping diodes in each of the circuits 29, 31 form a three phase half-wave rectifier bridge connected to the three output lines of the bias transformer 79. The three diodes 21, 23, 25 connected across the three SCR's 11, 13, 15 also form a three phase half-wave rectifier bridge for the three phase input lines to transformer 17. Therefore, the voltage waveforms produced by the three clamping diodes are the same as seen by the three SCR's. Since the phase rotation in the secondary phase lines of the bias transformer 79 is synchronized to that of the SCR input lines, each SCR is fired at the appropriate phase angle in its respective phase.

What is claimed is:

1. In a power supply system having three input lines for receiving three phase A.C. power, a circuit for automatically balancing the current in said input lines comprising:

a regulating element connected in series with each of said three input lines, each of said regulating elements having a gate control electrode;

means connected respectively to the gate control electrodes of said regulating elements for triggering each of said regulating elements into conduction at selected phase angles of the voltages on said input lines;

means for sening positive and negative current in each of two of said three input lines; and means for controlling the triggering means associated with the regulating element in each of said two input lines in response to the difference in magnitude between said positive and negative current sensed in the corresponding line by said sensing means to adjust the phase angle at which the regulating element in each of said two input lines is triggered into conduction, thereby to equalize the currents in said three input lines.

2. The system of claim 1, further including means for selectively enabling said triggering means to cause said regulating elements to conduct in phase sequence.

3. The balancing system of claim 1, said sensing means including means for providing positive and negative output signals proportiontal to said positive and negative current in each of said two input lines;

said controlling means including:

means for providing a first voltage referenced to the zero crossover point between said positive and negative output signals;

means for storing said positive and negative output signals;

means connected to said storing means for providing a second voltage referenced to the sum of the stored positive and negative output signals; and comparing means for providing a variable output signal proportional to the difference between said first and second voltages; and said triggering means being operable in response to the variable output signals from said comparing means.

4. The line balancing system of claim 3, said triggering means including:

resettable time delay for repeatedly producing predetermined signals on successive cycles of said three phase A.C. input at phase angles determined in response to the variable output signals from said controlling means; and switching means responsive to said predetermined input signals for pulsing the gate control electrodes of the regulating elements in said two of the three input lines.

5. The system of claim 1, said current sensing means including first and second transformer means coupled respectively to said two of the three input lines for providing positive and negative output signals proportional to said positive and negative current in each of said two input lines, each of said transformer means having a pair of output terminals;

said controlling means including first and second circuit means responsive to the output signals from said first and second transformer means, each of said circuit means including:

two capacitors connected in series and having a common junction point connected to one of said output terminals;

asymmetrically conducting means connected between the other one of said output terminals and each of said two capacitors for charging said two capacitors in response to said positive and negative output signals, respectively;

voltage divider means connected in parallel with said two series connected capacitors, said voltage divider means having an intermediate tap point;

differential amplifier means for comparing the voltage at the common junction point of said two capacitors with the voltage at the intermediate tap point of said voltage divider means, said differential amplifier means including means providing a difference signal output; and said triggering means including first and second pulse generating means for gating the regulating elements in said two of the three input lines at phase angles determined by the difference signal outputs from said first and second circuit means, respectively.

6. In a power supply including three input lines connectable to a source of unregulated three phase A.C. input power and output terminal means for providing D.C. power to a load, and also including three gate controlled asymmetrically conducting switching elements connected in series with said three input lines, repectively, for regulating the power supplied to said output terminal means, a system for controlling said three switching elements comprising:

first, second and third means for respectively triggering said three switching elements into conduction at selected phase angles of the A.C. input to said three switching elements;

means responsive to said three phase A.C. input for selectively enabling said first, second and third triggering means during the respective phase of each cycle of said A.C. input;

feedback means responsive to the load conditions at said output terminal means for adjusting the phase angles at which said first, second and third triggering means are operated to regulate output power; and phase current balancing means responsive to the current in two of said three input lines for adjusting the phase angles at which said first and second triggering means are operated to equalize the current in said three input lines.

7. The control system of claim 6, said first, second and third triggering means each including:

pulse generating means for gating the corresponding one of said three switching elements in response to a predetermined voltage level input;

chargeable capacitor means for providing said predetermined voltage level input;

said phase current balancing means including:

first and second means for sensing positive and negative current in each of said two of the three input lines;

first and second comparing means for determining the difference in magnitude between said positive and negative current sensed by said first and second sensing means, respectively, said first and second comparing means each including means for charging the chargeable capacitor means of the corresponding one of said first and second triggering means up to said predetermined voltage level input at a rate dependent on the difference in magnitude between said positive and negative current.

8. The control system of claim 7, said pulse generating means including a blocking oscillator.

9. The control system of claim 7, said means for selectively enabling said first, second and third triggering means including resetting means for discharging said chargeable capacitor means once during each cycle of said A.C. input.

References Cited

UNITED STATES PATENTS

| | | | |
|---|---|---|---|
| 2,239,289 | 4/1941 | Goodhue et al. | 321—19X |
| 3,368,129 | 2/1968 | Chausse et al. | 317—27X |
| 3,390,321 | 6/1968 | Plow | 321—5 |
| 3,400,321 | 9/1968 | Lafuze | 321—11X |
| 3,401,308 | 9/1968 | Darke | 317—27X |
| 3,474,321 | 10/1969 | Ainsworth | 321—18X |

WILLIAM M. SHOOP, JR., Primary Examiner

U.S. Cl. X.R.

321—11, 19, 40